(12) United States Patent
Rudi et al.

(10) Patent No.: US 6,450,434 B1
(45) Date of Patent: Sep. 17, 2002

(54) WIDE TAPE HOLDING FRAME

(75) Inventors: Guttorm Rudi, Fjellhamar; Ladislav Rubas, Tranby, both of (NO)

(73) Assignee: Tandberg Data ASA, Oslo (NO)

( * ) Notice: Subject to any disclaimer, the term of this patent is extended or adjusted under 35 U.S.C. 154(b) by 0 days.

(21) Appl. No.: 10/052,839

(22) Filed: Nov. 7, 2001

(51) Int. Cl.[7] .............................................. G03B 23/02
(52) U.S. Cl. ..................................... 242/345; 360/132
(58) Field of Search ............................ 242/345, 345.1, 242/345.2, 335, 352, 352.3, 352.4; 360/95, 96.1, 132, 134, 137

(56) References Cited

U.S. PATENT DOCUMENTS

| | | | | |
|---|---|---|---|---|
| 695,639 A | * | 3/1902 | Goerz | 242/345 |
| 3,377,438 A | * | 4/1968 | Schroter | 360/132 |
| 3,677,487 A | * | 7/1972 | Knowles et al. | 242/345 |
| 4,019,695 A | * | 4/1977 | Wharam | 242/345 |
| 4,526,330 A | * | 7/1985 | Shimizu | 242/345 |
| 5,620,265 A | * | 4/1997 | Kondo | 242/345.2 |
| 6,267,313 B1 | * | 7/2001 | Saliba et al. | 242/345 |
| 6,305,631 B1 | * | 10/2001 | Erickson et al. | 242/345 |

* cited by examiner

Primary Examiner—William A. Rivera
(74) Attorney, Agent, or Firm—Schiff Hardin & Waite (57) ABSTRACT

A holder for wide magnetic recording tape has a frame with four generally rectangular sides and an open top and an open bottom, with a frame height extending between the open top and the open bottom. Magnetic recording tape is wound in tape packs respectively on two hubs that are rotatably mounted between opposite sides of the frame. Because of the open structure of the frame, during a write/read operation the tape pack on one of the hubs can have a diameter which exceeds the height of the frame, thereby allowing substantially all of the magnetic recording tape to be wound on one of the hubs, if necessary.

18 Claims, 9 Drawing Sheets

WIDE TAPE HOLDING FRAME

BACKGROUND OF THE INVENTION

1. Field of the Invention

The present invention relates to a holder for wide magnetic recording tape.

2. Description of the Prior Art and Related Applications

The use of magnetic tape as a medium for data recording has the significant advantages of a relatively low cost and a relatively large recording surface area. Nevertheless, conventional magnetic tape has certain disadvantages associated therewith.

A first of these disadvantages is that tape is a sequential medium, which means that when a data transfer head is located at a beginning of a tape, it is necessary for the tape to be transported along its entire length in order to retrieve (or re-write) information at the end of the tape.

A second disadvantage is that, due to the desire and necessity of storing as much data as possible within an available tape area, the data transfer head technology as well as the recording media technology are pushed to their quality limits.

Moreover, many existing drives and cartridges must be designed within specified form factors, in order to satisfy standardization requirements. As an increasing number of functions become available, which are desired to be accommodated in a drive or on a tape, data storage area or other functions must be sacrificed to accommodate the new, additional functions, or some type of compromise must be reached in the overall design.

Among the more important market requirements which are expected in the near future for data storage on tape is that the need for higher storage capacity will continue to increase, at an even faster rate than previously. As discussed below, for example, the storage capacity of a currently available single cartridge is not sufficient for unattended backup during a longer period of time, and therefore so-called autoloader systems have been developed to automatically insert and remove a number of cartridges in a sequence.

Further market requirements are expected to be a need for faster time to access data, a need for an increased data transfer rate, a lower cost per MB (megabyte) and an overall improved quality and reduced cost.

As noted above, the limited data storage capacity of conventional cartridges has resulted in the development of autoloader systems. Conventional autoloader systems, however, are not a satisfactory solution to the problem of storing a large amount of data in an unattended backup procedure over a relatively long period of time. Several disadvantages exist with regard to currently available autoloader systems.

Because such autoloader systems make use of a large number of cartridges, the cartridges are made relatively small, and therefore have a limited space available for use for data storage. Typically, six to ten of such cartridges must be put in a magazine in order to have sufficient storage area (capacity). Because of the relatively small size of the cartridges, the drive is also made small, in order to match standardized form factors. The drive is disposed in a system housing, which also contains robotics, electronics and software needed for loading an unloading the cartridges.

The relatively large number of components, and therefore the relatively high cost, associated with conventional autoloader systems makes the use of such systems an unattractive alternative for a customer who merely wants long term data backup.

To address these problems, a tape cartridge and a drive for extremely wide tape are disclosed in co-pending U.S. application Ser. No. 691,165, filed Oct. 19, 2000, the teachings of which are incorporated herein by reference. The tape cartridge and drive described therein accommodate tape having an extremely wide width, such as a width that is greater than approximately 24 mm, or in a range between approximately 24 mm and approximately 127 mm.

The width of this extremely wide tape, therefore, is greater than that of a conventional magnetic recording tape by a factor of 6 to 10 times. Because the tape has this extremely wide width, the total tape length can be made significantly shorter while still making the same total area available for data storage. Making the tape shorter, however, requires less time for winding and unwinding the tape from the hubs on which it is carried in order to access data at a particular location on the tape.

It is important, however, that the housing for accommodating such extremely wide tape have the same, or substantially the same, form factor as conventional recording cartridges, so as to be accommodated in the openings for conventional tape cartridges in tape drives and auto loaders and magazines. This means that the axes of rotation of the tape hubs in cartridges for accommodating extremely wide tape will proceed parallel to a "longer" dimension of the cartridge housing, rather than perpendicular to the shortest dimension (height) as in a conventional cartridge housing. Given a length of extremely wide tape which is necessary to provide the same total area available for recording data on the tape as a conventionally sized tape, such a length of extremely wide tape can be accommodated in a housing having a height which is comparable to the height of a conventional tape cartridge only when the tape is substantially evenly distributed in respective tape packs on the two hubs in the housing. When any significant amount of extremely wide tape is wound onto one of the hubs, the diameter on the tape pack on that hub increases beyond the standard height of a conventional cartridge housing.

This problem could be addressed by simply providing a lesser length of extremely wide tape in the cartridge, so that even when all of the tape is wound on one tape hub in one tape pack, the diameter of that tape pack still would not exceed the height of a standard tape cartridge.

This would defeat one of the advantages of employing extremely wide tape, however, by decreasing the total area available for recording data.

To address this problem a tape cartridge is disclosed in co-pending U.S. application Ser. No. 09/859,328, filed May 16, 2001, which accommodates an amount of extremely wide tape therein having a total area available for data recording which is substantially the same as the area available for data recording in a conventional tape cartridge, and which has a form factor which is substantially the same as the form factor for a conventional tape cartridge. The tape cartridge disclosed in this co-pending application has a housing with two tape hubs rotatably mounted therein with wide magnetic recording tape wound thereon for winding and unwinding between the two hubs in a tape transport direction, with the housing being composed of first and second housing parts which are movable relative to each other in a direction perpendicular to the tape transport direction and which is also perpendicular to the rotational axes of the hubs, to accommodate an increase in diameter of the tape pack on one of the hubs which arises as the extremely wide tape is wound onto that hub. The housing thus can expand in the movement direction.

SUMMARY OF THE INVENTION

It is an object of the present invention to provide a holder for wide recording tape which accommodates a length of extremely wide recording tape having a reduced access time to data in comparison to conventional width recording tape with the same area available for data recording, and wherein the holder has a form factor which is substantially the same as that of a standard tape cartridge.

The above object is achieved in accordance with the principles of the present invention wherein the tape holder is formed by a four-sided frame in which two tape hubs are disposed, with wide magnetic recording tape wound thereon for winding and unwinding between the hubs in a tape transport direction. The frame therefore does not form a housing in the conventional sense because it does not have a top and a bottom which are permanently fixed to the sides of the frame. The frame may be provided with a top cover and a bottom cover for protecting the recording tape from dust and other contamination during storage, however, if such covers are used, they do not have a permanent connection to the frame, and are only held in place by a snap arrangement, so that during use of the frame in the drive, the covers are separated from the frame and therefore the frame is open at the top and at the bottom, and the diameter of the respective tape packs on the hubs is therefore not constrained by any fixed housing dimensions.

It is not necessary, however, to provide the frame with a top cover and a bottom cover, if the frame can be stored, when not in use in the drive, in a magazine or some other type of enclosure which serves for dust protection.

DESCRIPTION OF THE PREFERRED EMBODIMENTS

Figures 1, 1A, 1C:
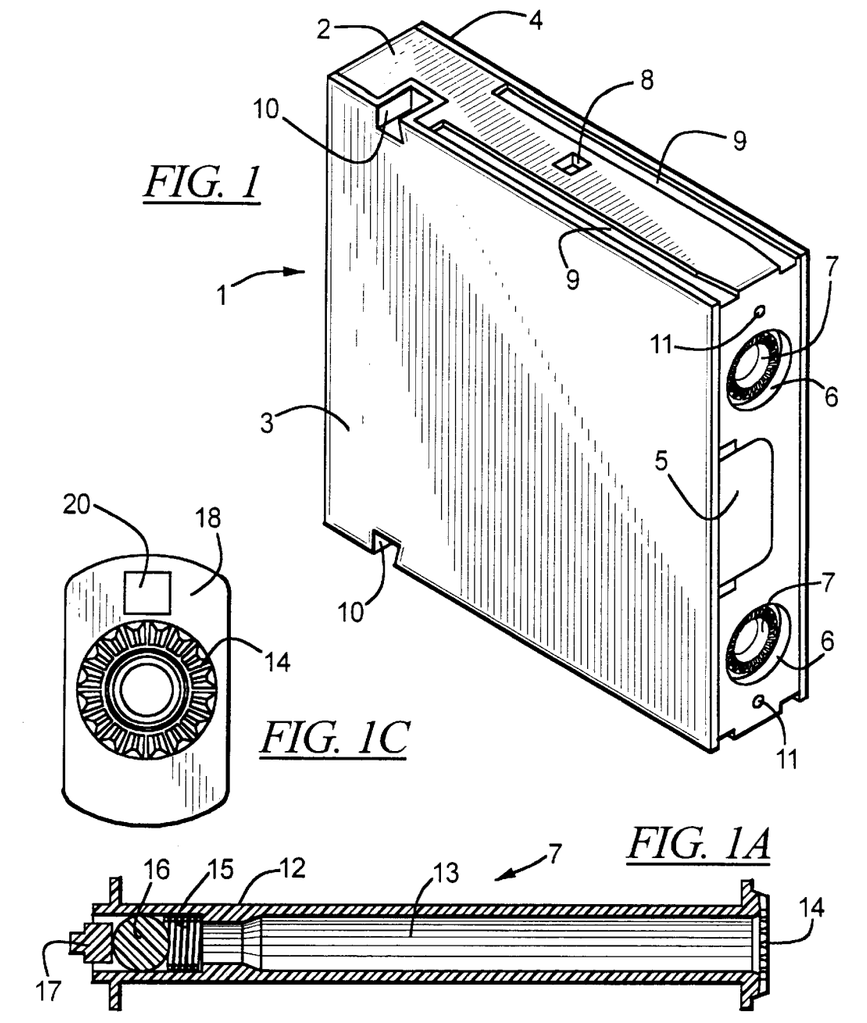
FIG. 1 a perspective view of a wide tape holding frame constructed in accordance with the principles of the present invention.
FIG. 1A is a sectional view through one of the tape hubs in the wide tape holding frame in accordance with the invention.
FIG. 1C is an end view of one of the tape hub flanges in the wide tape holding frame in accordance with the invention.

The wide tape holding frame and cover assembly 1 shown in FIG. 1 has a rectangular frame 2 with a bottom cover 3 and a top cover 4. One side of the frame 2 has a hinged access door 5, which allows tape guides and a read/write head element to be inserted, as described in further below. This side of the frame 2 also has access openings 6 respectively in registration with tape hubs 7 that are rotatably mounted in the frame 2. The access openings 6 allow respective drive shafts of a tape drive to be inserted into the tape hubs 7, as also described in more detail below.

Each lateral side of the frame 2 has an opening 8 therein, which serves two purposes. The opening 8 serves as a gripper recess during loading of the cartridge into a drive, as described in more detail below, and also serves as an access opening for receiving projection 21 (see FIG. 3) on the bottom cover 3, as also described in more detail below.

Figures 5, 8:
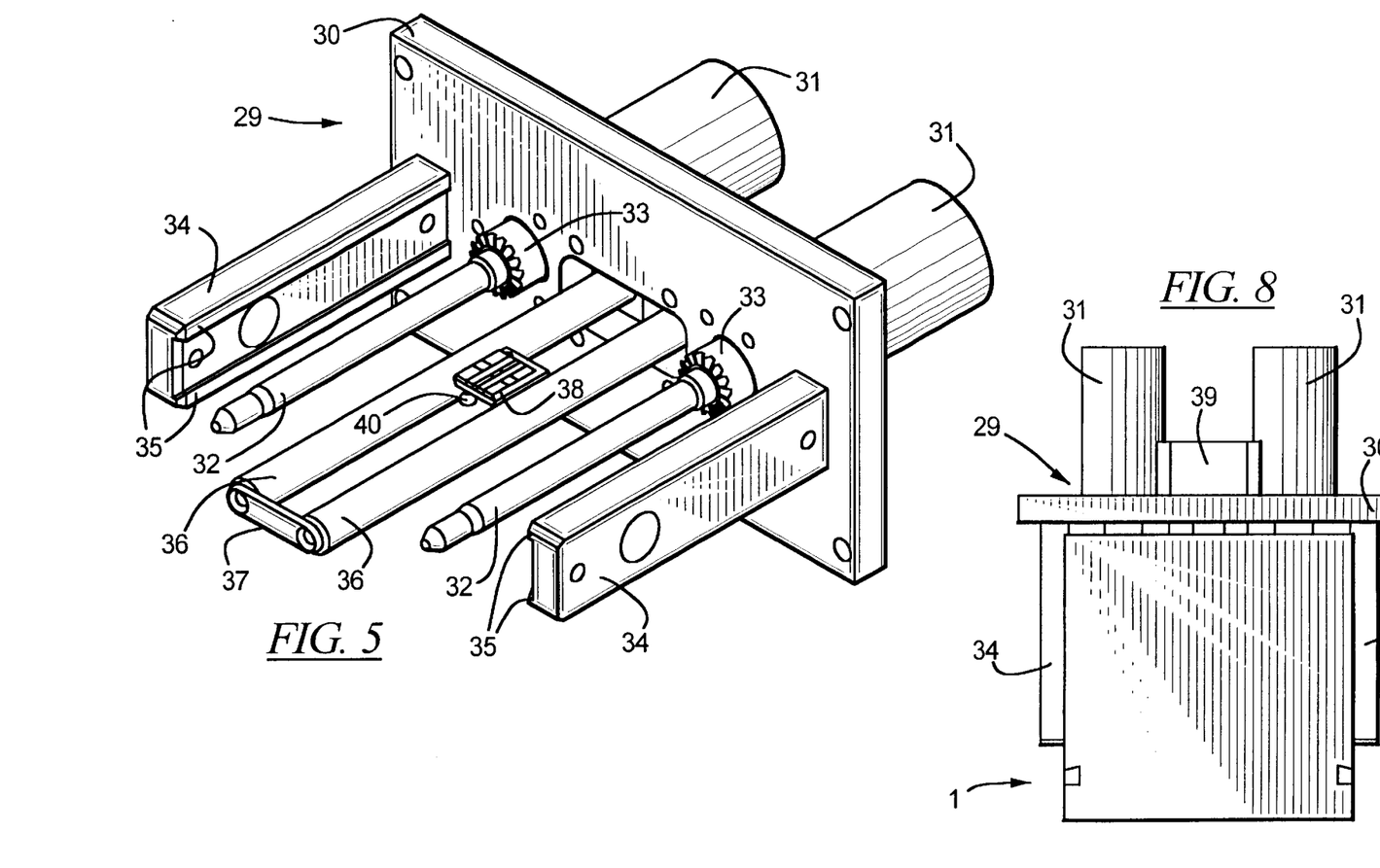
FIG. 5 is a perspective view of a schematically illustrated wide tape drive.
FIG. 8 is a bottom view of the wide tape holding frame in accordance with the invention in a schematically illustrated wide tape drive.

Each lateral side of the frame 2 also has grooves 9 which respectively receive projecting surfaces 25 of cartridge guides 34 of the drive 29 (see FIG. 5). The drive 29 is shown only schematically herein. Further details of the drive 29 are described in copending application "Wide Tape Drive for Wide Tape Holding Frame," Rudi et al., Ser. No. 10/052,826 filed simultaneously herewith, the teachings of which are incorporated herein by reference.

Recesses 10 are also formed in the bottom cover 3 and the frame 2 which serve as notches for robotic handling of the frame 2, with or without the covers 3 and 4.

The side of the frame 2 in which the access door 5 and the access openings 6 are disposed also has sight openings 11, the purpose of which is described below.

Figure 1B:
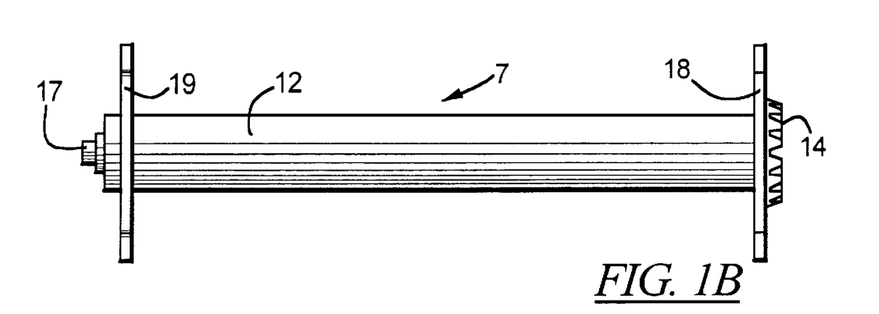
FIG. 1B is a side view of one of the tape hubs in the wide tape holding frame in accordance with the invention.

A cross-sectional view of the tape hub 7 is shown in FIG. 1A, with an exterior view being shown in FIG. 1B. Each tape hub 7 has a shaft 12 with an internal bore 13 therein and flanges 18 and 19 at opposite ends. The flange 18 is disposed adjacent to the side of the frame 2 in which the access openings 6 are present, and has toothed projections 14 for engagement with the tape drive 29 in a known manner.

Each tape hub 7 further has a spring 15, a thrust ball 16 and a thrust element 17, which interact with a drive shaft of the tape drive 29 in the manner described in more detail below. The thrust element 17 also serves as a rotatable mount for the hub 7, and is received in an opening in a side of the frame 2 opposite to the side containing the access opening 6. The exterior of the projecting teeth 24 fit into the access opening 6 and serve to rotatably mount the opposite end of the tape hub 7.

Figure 3:
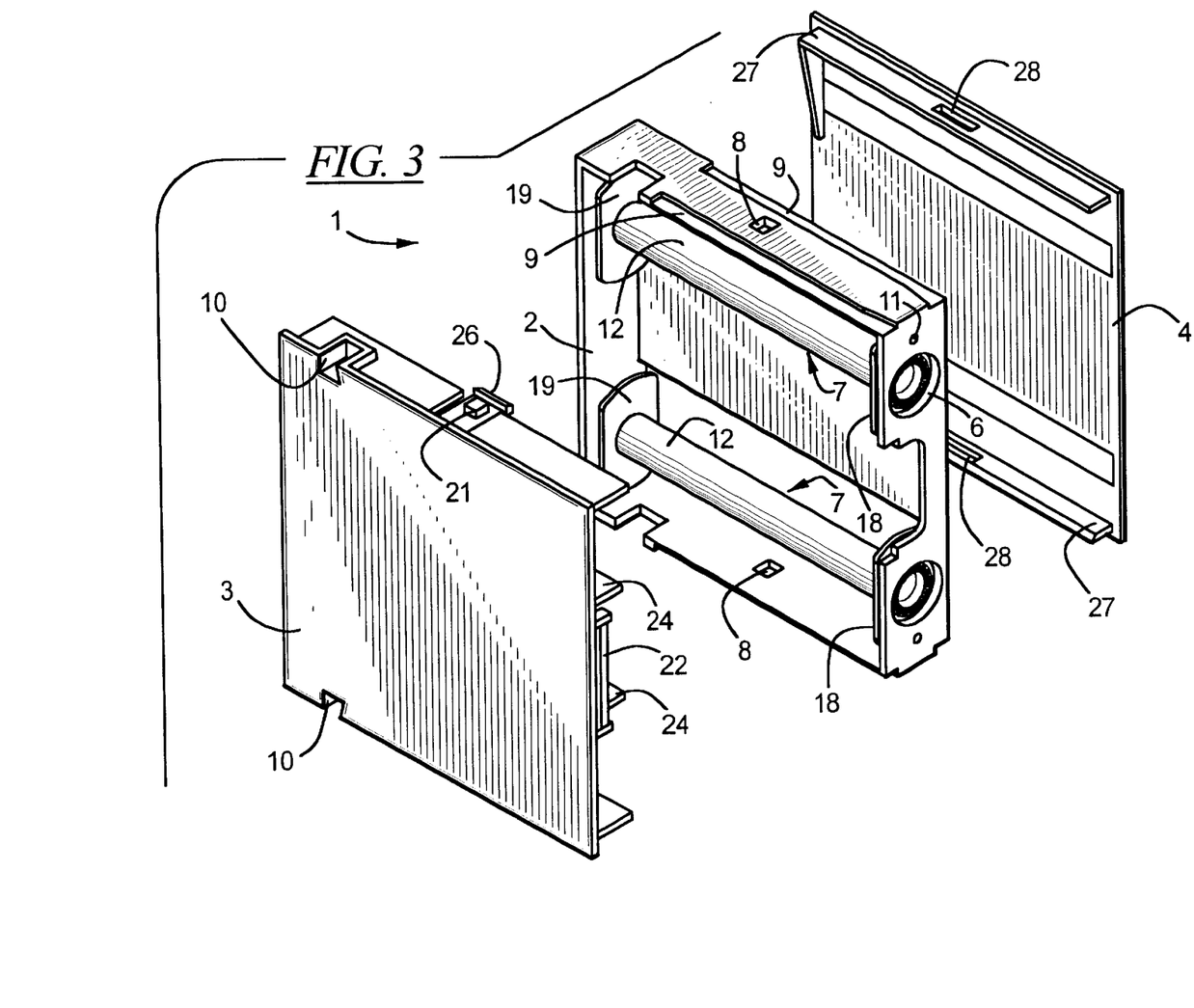
FIG. 3 is an exploded view of the wide tape holding frame in accordance with the invention.

The flange 18 which, as noted above, is adjacent to the side of the frame 2 containing the access opening 6, has a reflective surface 20 thereon which, when the oblong flanges 18 and 19 are oriented within the confines of the frame 2 (as shown in FIG. 3) is disposed behind the sight opening 11. The reflective surface 20 has a different reflection characteristic from the remainder of the material of the flange 18, such as by being a different color. A light transmitter/receiver arrangement (not shown) in the tape drive 19 thus can determine when the flange 18 (and thus the flange 19 as well) are oriented as shown in FIG. 3, or at an angle relative to that position to accommodate an increased diameter of tape wound on the hub 7.

The frame 2 with the tape hubs therein can be used by itself in an environment which is suitably dust-free and contamination-free. The covers 3 and 4 are optional, for providing a complete enclosure the magnetic recording tape wound on the tape hubs 7, when necessary.

The dimensions of the frame 2 with equal amounts of tape wound on the respective tape hubs 7 are approximately 4"×4"×0.8". In a write/read operation mode, the maximum tape pack diameter can be approximately 0.9". The frame 2 alternatively can have dimensions of 4"×5". If the top and bottom covers 3 and 4 are used, the cartridge dimensions therewith are approximately 4"×4"×1". The distance between the outside surfaces of the covers 3 and 4 in the write/read position (shown in FIG. 2) is approximately 1.6". This means that the cartridge will fit into a standard form factor drive.

Figure 13:
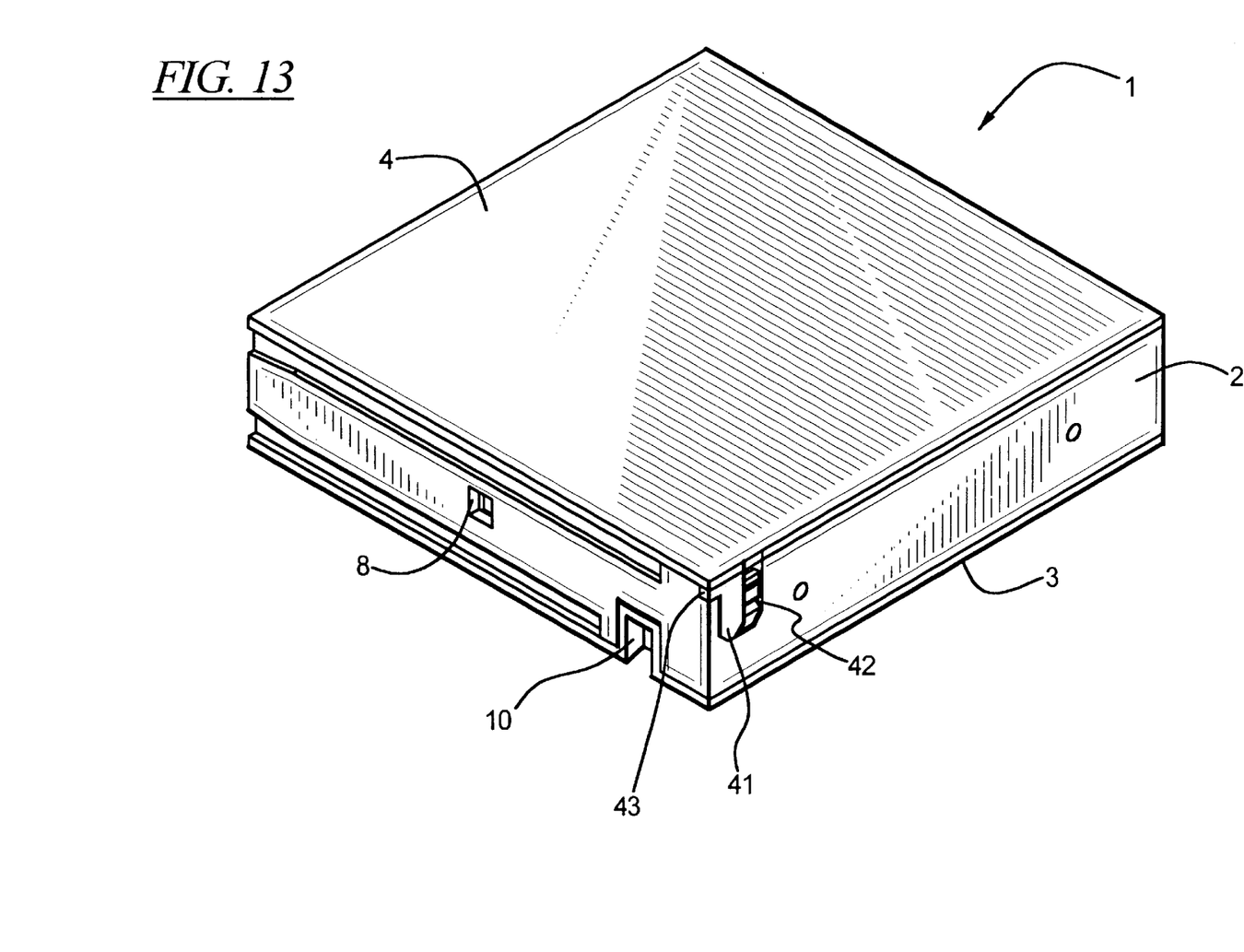
FIG. 13 is a perspective view from the rear of the wide tape frame in accordance with the invention, showing the write-preventing slide element.

As shown in FIG. 13, a slide element 41 is movable back and forth in an opening 42 in the backside of the frame 2. The element 41 has a tab 43 which, depending on position of the element 41, is either flush with or recessed from a side surface of the frame 2. The status (flush or recessed) of the tab 43 is detectable by suitable means (optical, sonic, etc.) in the drive 29. Depending on the position of the slide element 41 in the opening 42, which is manually set, the drive will enable or disenable writing of data on the tape 23, thereby preventing an inadvertent alteration of previously recorded data.

Figures 2, 4:
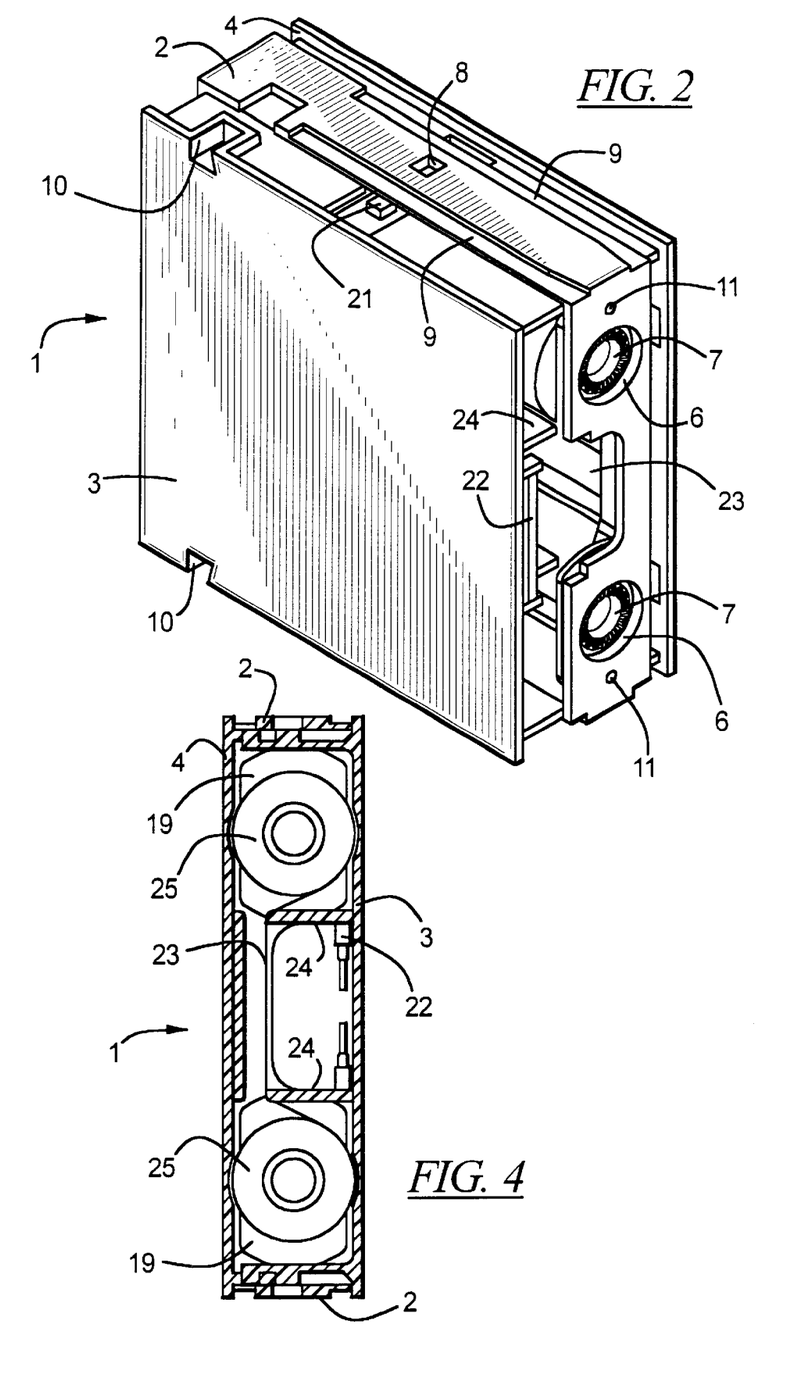
FIG. 2 shows the wide tape holding frame of FIG. 1 with the top cover and the bottom cover separated from the frame.
FIG. 4 is a section view through the wide tape holding frame of FIG. 1.
Figure 6:
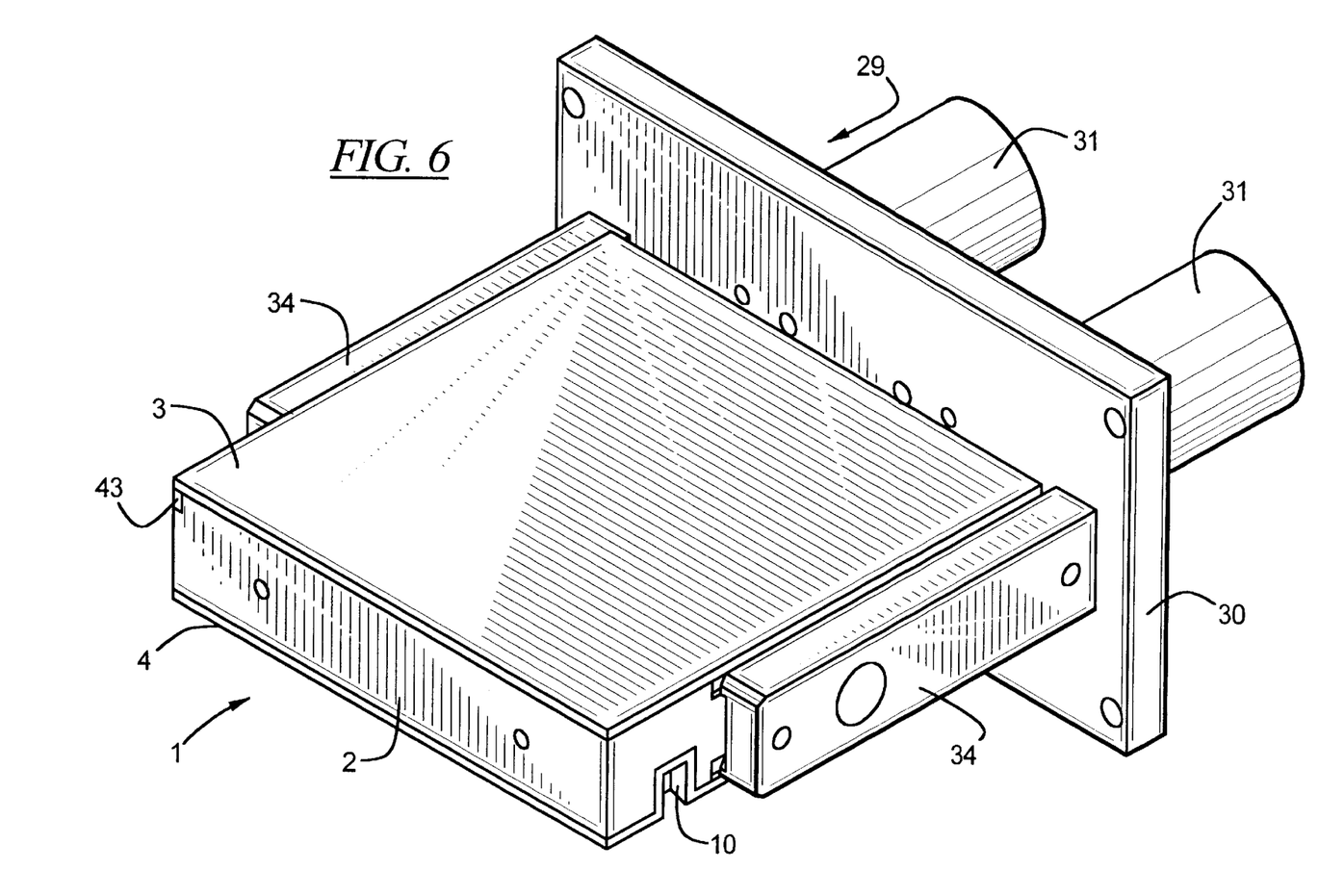
FIG. 6 shows the wide tape holding frame in accordance with the invention in a schematically illustrated wide tape drive.
Figure 7:
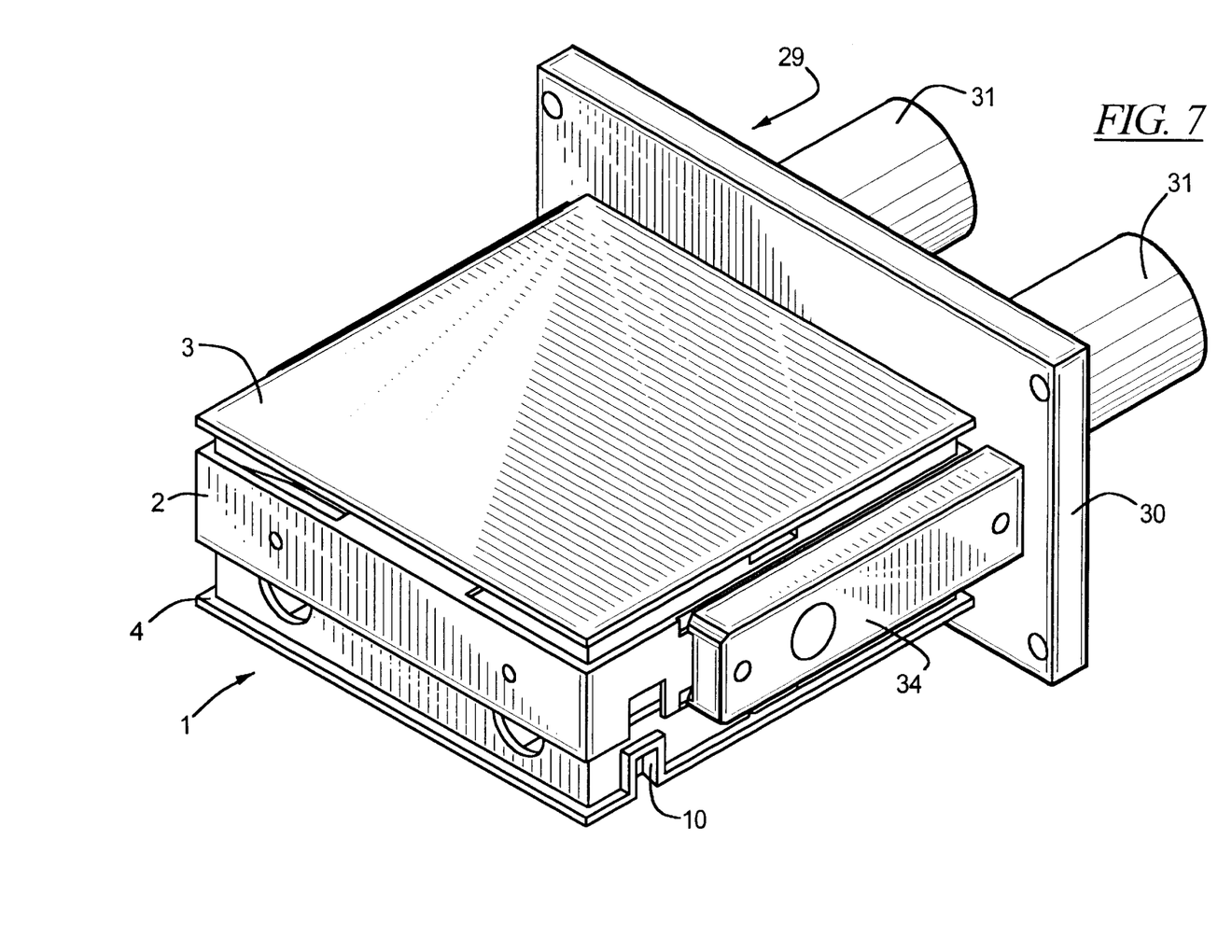
FIG. 7 shows the wide tape holding frame in accordance with the invention with the top and the bottom cover separated therefrom in the schematically illustrated wide tape drive.

The expanded assembly 1 is shown in FIG. 2, to illustrate the position of the components when it is in a drive (the surrounding drive not being shown in FIG. 2) for conducting a read or write operation. The top and bottom covers 3 and 4 have been separated by the frame 2 by an appropriate mechanism in the tape drive 29. The initial position of the assembly 1 in the tape drive 29 is shown in FIG. 6, and the expanded position is shown in FIG. 7. An appropriate mechanism in the guides 34 presses through the access opening 8 in each side of the frame 2, thereby pressing against the projection 21 and releasing the bottom cover 3 from the frame 2. The projection 21 is mounted on a flexible flap, which has a flange 26 at its end which engages an opening 28 in an inner flange 27 of the top cover 4. When the projection 21 is pressed to release it from the access opening 8, this also causes the flap to flex, thereby also releasing the flange 26 from the opening 28, thereby freeing the top cover 4 from the frame 2 as well.

As can be seen in FIG. 2 as well as in the cross-sectional view in FIG. 4 and the exploded view in FIG. 3, the bottom cover 3 has tape guides 24 projecting inwardly therefrom, which hold the tape 23 in a position for engagement with the write/read head 38 (shown in FIG. 5) in the write/read mode. In the write/read mode only writing may take place, or only reading, or both. If the top and bottom covers 3 and 4 are not used, the tape guides 23 can be mounted to project inwardly from the frame 2. The axle 22 for the access door 5 also can be seen as projecting inwardly from the bottom cover 3.

In the expanded condition shown in FIG. 2, all of the tape 23 is wound onto one of the tape hubs 7, with the flange. 65 thereof being rotated approximately perpendicularly to the position shown in FIG. 4, wherein equal amounts of tape 23 are wound on the two hubs 7. The rotation of the flanges takes place during the initial startup of the transport motion of the tape 23, with a small amount of friction being present at that time, which is all that is needed to rotate the flanges 18 and 19 by approximately one-quarter rotation.

As noted above, when the assembly 1 is inserted in the tape drive 29 it is engaged with guides 34 on opposite sides, via the grooves 9. The guides 34 are rigidly mounted to a base plate 30, to which drive motors 31 are also mounted.

As can be seen in FIG. 5, each of the motors 31 has a drive shaft 32, and a toothed rim 33, which engages the teeth 14 on the tape hub 7. The read/write head 38 is moved along guide rods 36, connected by a connector 37, via a conical roller 40 by an actuator 39, mounted to the plate 30.

Figure 11:
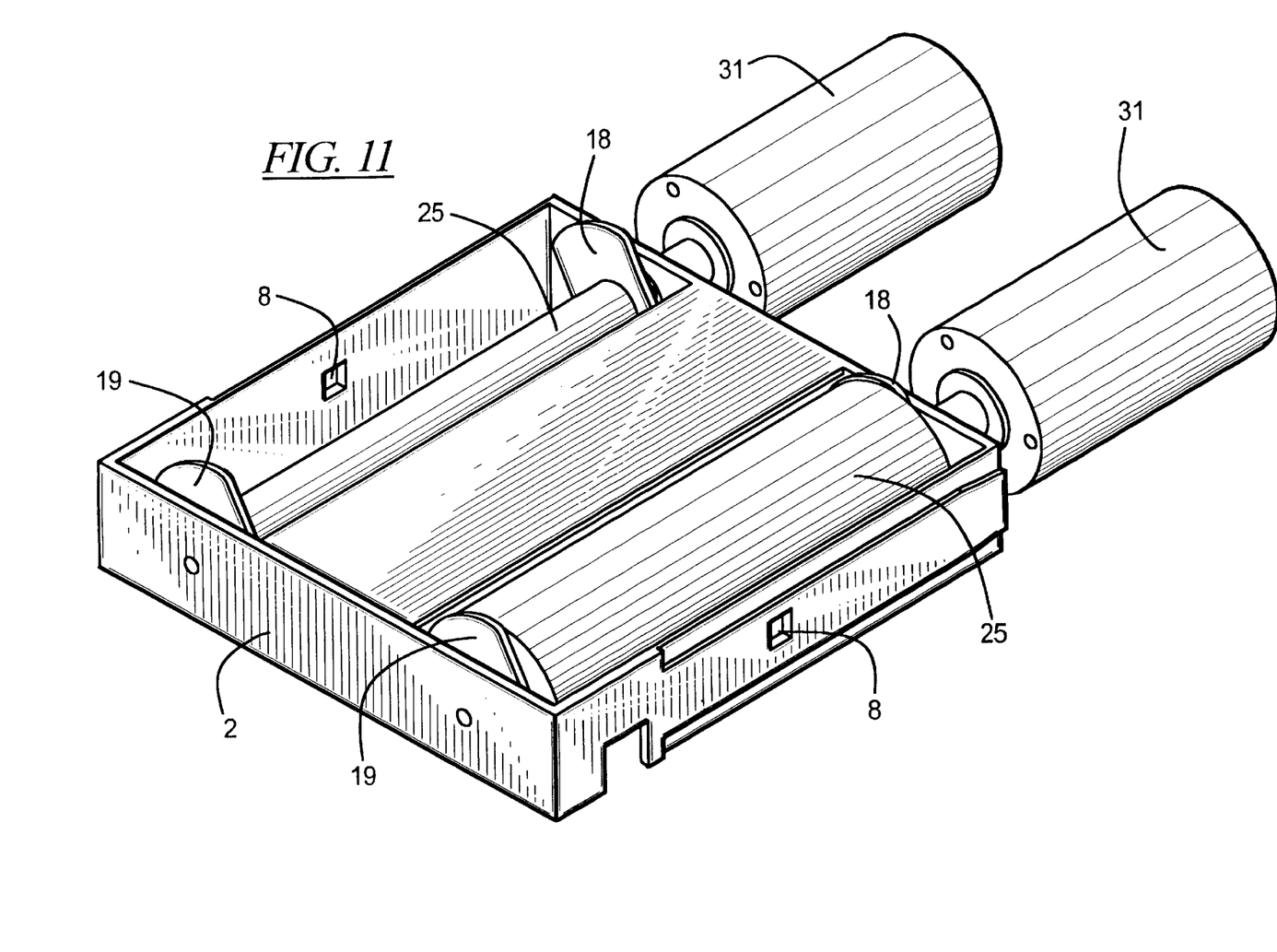
FIG. 11 schematically illustrates the wide tape holding frame, without the top cover and the bottom cover, connected with two drive motors of the wide tape drive.

A plan view of the assembly 1 loaded into the tape drive 29 is shown in FIG. 8, and the arrangement without the covers, and without the plate 30, is shown in FIG. 11, with all of the tape 25 being wound on one of the tape hubs 7.

Figures 9, 10, 12:
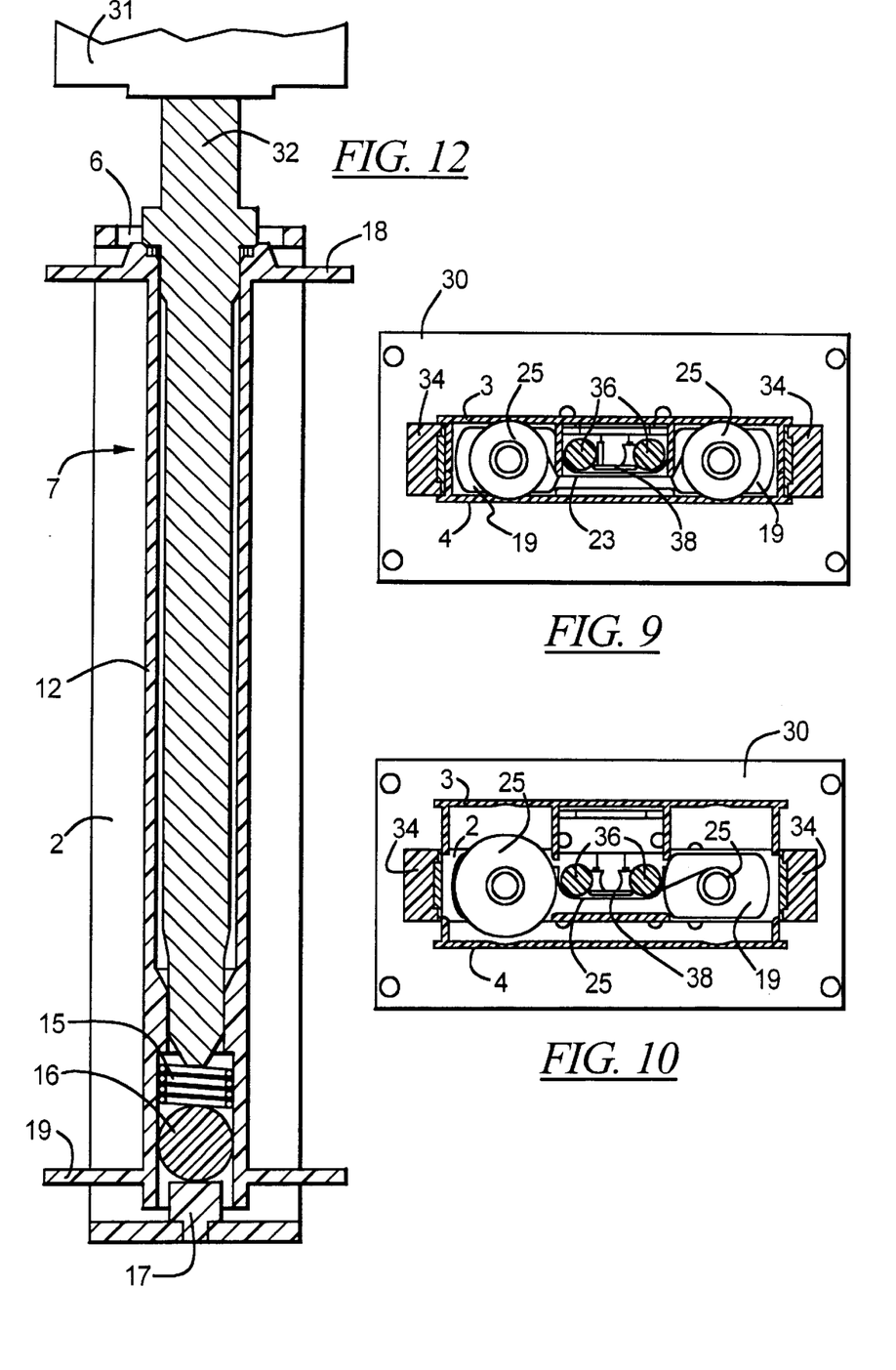
FIG. 9 is sectional view through the wide tape holding frame and wide tape drive shown in FIG. 6.
FIG. 10 a sectional view through the wide tape holding frame and wide tape drive shown in FIG. 7.
FIG. 12 is a sectional view of a drive shaft of one of the drive motors of the wide tape drive engaged in one of the tape hubs in the wide tape holding frame in accordance with the invention.

Sectional views of the assembly 1 loaded into the drive 29 are shown in FIG. 9 (before expansion) and FIG. 10 (after expansion).

The engagement of a drive shaft 32 of one of the drives 31 is shown in FIG. 12. When fully inserted with the teeth engaged, the end of the drive shaft 32 presses against the spring 15, which in turn rides against the thrust ball 16. The thrust element 17 is mounted in the frame 2, so that the thrust ball 16 is free to rotate between the spring 15 and the thrust element 17, thereby maintaining radial alignment during rotation of the tape hub 7. When the drive shaft 32 is removed, the spring 15 forces the flange 18 into the access opening 6, thereby limiting rotation of the hub 7.

Although modifications and changes may be suggested by those skilled in the art, it is the intention of the inventors to embody within the patent warranted hereon all changes and modifications as reasonably and properly come within the scope of their contribution to the art.

We claim as our invention:

1. A holder for wide magnetic recording tape comprising:
   a frame having four generally rectangular sides, an open top and an open bottom, and a frame height between said open top and open bottom;
   two hubs, each rotatably mounted in and extending between opposite sides of said frame and each having a hub shaft with a shaft length;
   magnetic recording tape wound in respective tape packs on said hubs for winding and unwinding between said hubs in a tape transport direction, said tape having a width substantially equal to said shaft length; and
   each of said tape hubs having non-circular, elongated flanges respectively disposed at opposite ends of said hub shaft, each flange having a width which is not greater than said frame height and a length which is greater than said frame height and which is at least equal to a diameter of one of said tape packs with all of said magnetic recording tape wound therein.

2. A holder as claimed in claim 1 wherein one of said opposite sides in which said two hubs are rotatably mounted has access openings, respectively in registration with said two hubs, exposing respective ends of said two hubs to an exterior of said frame.

3. A holder as claimed in claim 2 wherein said one of said opposite sides has a further access opening therein, disposed between said access openings in registration with said two hubs, said further access opening being normally closed by a hinged door.

4. A holder as claimed in claim 2 wherein each of said hub shafts has a bore therein proceeding through said hub shaft.

5. A holder as claimed in claim 4 further comprising respective thrust elements mounted in the other of said opposite sides of said frame and extending into said bore, said hub shafts being respectively rotatable around said thrust elements.

6. A holder as claimed in claim 5 wherein each of said hubs further comprises a spring disposed against a shoulder in said bore and a thrust ball disposed between said spring and said thrust element, said spring normally urging said hub against one of said opposite sides to limit rotation of said hub.

7. A holder as claimed in claim 1 wherein the respective flanges, due to rotation of the respective hubs, are orientable parallel to said one of said sides of said frame and substantially perpendicular to said one of said sides of said frame, and wherein each of said flanges has a surface facing said one of said sides of said frame with a region thereof which reflects light differently from a remainder of said surface, and wherein said one of said sides of said frame has sight openings therein respectively disposed so that when said flanges are parallel to said one of said sides said region is disposed in registration with said sight opening and when said flanges are disposed substantially perpendicular to said one of said sides, said regions are not in registration with said sight openings.

8. A holder as claimed in claim 1 further comprising a top cover that is non-permanently attachable to said frame for closing said top opening and a bottom cover that is non-permanently attachable to said frame for closing said bottom opening.

9. A holder as claimed in claim 8 further comprising side access openings respectively disposed in sides of said frame proceeding between said opposite sides, and wherein said bottom cover has two flexible elements respectively proceeding from said bottom cover toward said top opening, each of said flexible elements having a projection thereon, said projections being respectively in registration with said access openings for non-permanently attaching said bottom cover to said frame, and each of said flexible elements further having a flange thereon, said flanges respectively engaging recesses in said top cover to non-permanently attach said top cover to said frame.

10. A holder for wide magnetic recording tape comprising:
a frame having four generally rectangular sides, an open top and an open bottom, and a frame height between said open top and open bottom;
a bottom cover closing said open bottom of said frame;
a top cover closing said open top of said frame;
a snap arrangement carried on one of said bottom cover and said top cover for non-permanently engaging said top cover and said bottom cover with said frame;
two hubs, each rotatably mounted in and extending between opposite sides of said frame and each having a hub shaft with a shaft length;
magnetic recording tape wound in respective tape packs on said hubs for winding and unwinding between said hubs in a tape transport direction, said tape having a width substantially equal to said shaft length; and
each of said tape hubs having non-circular, elongated flanges respectively disposed at opposite ends of said hub shaft, each flange having a width which is not greater than said frame height and a length which is greater than said frame height and which is at least equal to a diameter of one of said tape packs with all of said magnetic recording tape wound therein.

11. A holder as claimed in claim 10 wherein one of said opposite sides in which said two hubs are rotatably mounted has access openings, respectively in registration with said two hubs, exposing respective ends of said two hubs to an exterior of said frame.

12. A holder as claimed in claim 11 wherein said one of said opposite sides has a further access opening therein, disposed between said access openings in registration with said two hubs, said further access opening being normally closed by a hinged door.

13. A holder as claimed in claim 11 wherein each of said hub shafts has a bore therein proceeding through said hub shaft.

14. A holder as claimed in claim 13 further comprising respective thrust elements mounted in the other of said opposite sides of said frame and extending into said bore, said hub shafts being respectively rotatable around said thrust elements.

15. A holder as claimed in claim 14 wherein each of said hubs further comprises a spring disposed against a shoulder in said bore and a thrust ball disposed between said spring and said thrust element, said spring normally urging said hub against one of said opposite sides to limit rotation of said hub.

16. A holder as claimed in claim 10 wherein the respective flanges, due to rotation of the respective hubs, are orientable parallel to said one of said sides of said frame and substantially perpendicular to said one of said sides of said frame, and wherein each of said flanges has a surface facing said one of said sides of said frame with a region thereof which reflects light differently from a remainder of said surface, and wherein said one of said sides of said frame has sight openings therein respectively disposed so that when said flanges are parallel to said one of said sides said region is disposed in registration with said sight opening and when said flanges are disposed substantially perpendicular to said one of said sides, said regions are not in registration with said sight openings.

17. A method for storing and using wide magnetic recording tape comprising the steps of:
providing a frame having four generally rectangular sides and an open top and an open bottom, and having a height between said open top and said open bottom;
winding magnetic recording tape in tape packs respectively on two hubs rotatably mounted in said frame to allow winding and unwinding of said tape from said tape packs in a transport direction between said hubs, said tape having a width substantially coextensive with said hubs in a direction perpendicular to said height and perpendicular to said transport direction; and
in a write/read mode, winding said magnetic recording tape on one of said hubs to produce a tape pack on said one of said hubs having a diameter exceeding said height of said frame.

18. A method as claimed in claim 17 comprising the additional step of:
when neither of said tape packs has a diameter exceeding said height of said frame, temporarily closing said open bottom of said frame with a bottom cover and temporarily closing said open top of said frame with a top cover.

* * * * *